No. 745,551. PATENTED DEC. 1, 1903.
D. T. ABERCROMBIE.
TENT SLIDE.
APPLICATION FILED AUG. 8, 1902.
NO MODEL.
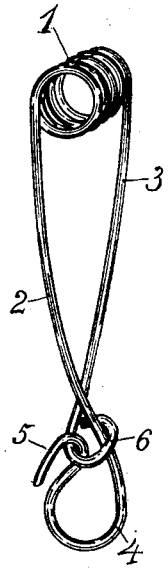
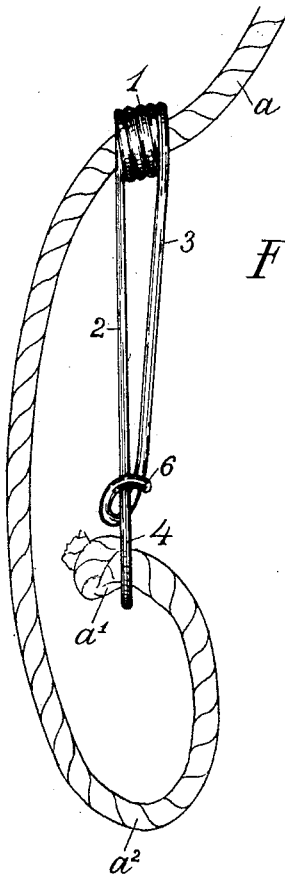
Witnesses
Ivan Konigsberg.
Harry H. Walton.
Inventor
David T. Abercrombie
By his Attorney
Alexander C. Proudfit.

No. 745,551.

Patented December 1, 1903.

UNITED STATES PATENT OFFICE.

DAVID T. ABERCROMBIE, OF NEWARK, NEW JERSEY, ASSIGNOR TO ABERCROMBIE AND FITCH, OF NEW YORK, N. Y., A FIRM.

TENT-SLIDE.

SPECIFICATION forming part of Letters Patent No. 745,551, dated December 1, 1903.

Application filed August 3, 1902. Serial No. 118,350. (No model.)

*To all whom it may concern:*

Be it known that I, DAVID T. ABERCROMBIE, of Newark, New Jersey, have invented certain Improvements in Tent-Slides, of which the following description, in connection with the accompanying drawings, is a specification, like numerals on the drawings designating like parts.

This invention has for its object the production of a wire "tent-slide" or device for securing adjustably the running noose or bight at the end of the guy-ropes to keep the latter taut on the pegs; and my improvements reside in the compact, strong, and simple features of construction to be illustrated and set forth clearly in the accompanying drawings and specification and pointed out in the claim.

In the drawings, Figure 1 is a view in perspective of a tent-slide in the construction of which my improvements have been embodied, and Fig. 2 is a view in side elevation thereof with the addition of a rope shown in place ready to be made taut.

In the embodiment of my invention selected as a convenient form for illustration and description to enable a ready and complete understanding of my improvements the part designated by the reference-numeral 1 is a loop, preferably of helical form, as shown, in which instance it comprises several turns in the medial portion of a piece of wire, the continuations 2 and 3 of the wire forming the helix being connected to prevent distortion of the loop under the strain of the rope $a$. (Shown in Fig. 2.)

The device will preferably be provided with a loop to receive the free end $a'$ of the bight or noose $a^2$ of rope, which may be secured, as usual in such devices, by a knot, as shown, and for the sake of strength and simplicity I have shown the securing-loop as formed by a bend 4 in the extension 2, the latter having a return bend or hook 5, through which is passed the portion 6 of the extension 3, the latter embracing the extension 2 at the base of the rope-securing loop interlocking therewith and presenting an extremely-strong joint constituting the connection referred to in the preceding paragraph.

The helix 1 and loop 4 are preferably transverse to the axis of the device as a whole and the relative proportions about as illustrated, and it will be seen that there are no sharp corners to catch the rope as it runs through the helix, furthering smoothness of operation, which may be aided also by using brass or galvanized-steel wire, although I do not limit myself to any particular material, nor to the exact form illustrated, nor in general otherwise than as set forth in the claim read in connection with this specification.

Having described my invention thus fully, what I claim, and desire to secure by Letters Patent, is—

A device of the class described consisting of a piece of wire formed medially into a helix to receive and run upon a rope, the wire ends being extended from said helix, one of them formed into a loop to receive and be secured to a free end of said rope and having a return-hook, the other free end being passed through said hook and around the shank portion of said first-mentioned end, interlocking therewith, substantially as described.

Signed at New York, in the county of New York and State of New York, this 29th day of July, A. D. 1902.

DAVID T. ABERCROMBIE.

Witnesses:
WESTMINSTER ABBEY,
HARRY H. WALTON.